(12) United States Patent  
Fukuzaki et al.

(10) Patent No.: US 9,170,841 B2  
(45) Date of Patent: Oct. 27, 2015

(54) MULTIPROCESSOR SYSTEM FOR COMPARING EXECUTION ORDER OF TASKS TO A FAILURE PATTERN

(71) Applicant: Panasonic Corporation, Osaka (JP)

(72) Inventors: Kiyokazu Fukuzaki, Osaka (JP); Masanori Henmi, Kyoto (JP); Hazuki Okabayashi, Kyoto (JP); Hiroyuki Murata, Shiga (JP); Takatsugu Sawai, Osaka (JP); Hiroyuki Shigeta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 343 days.

(21) Appl. No.: 13/718,670

(22) Filed: Dec. 18, 2012

(65) Prior Publication Data  
US 2013/0104137 A1 Apr. 25, 2013

Related U.S. Application Data

(63) Continuation of application No. PCT/JP2011/000325, filed on Jan. 21, 2011.

(30) Foreign Application Priority Data

Jul. 2, 2010 (JP) .................................. 2010-151533

(51) Int. Cl.  
*G06F 9/455* (2006.01)  
*G06F 9/48* (2006.01)  
*G06F 11/00* (2006.01)  
*G06F 9/50* (2006.01)

(52) U.S. Cl.  
CPC ............ *G06F 9/4887* (2013.01); *G06F 9/4881* (2013.01); *G06F 9/5038* (2013.01); *G06F 11/008* (2013.01)

(58) Field of Classification Search  
None  
See application file for complete search history.

(56) References Cited

U.S. PATENT DOCUMENTS 5,293,620 A * 3/1994 Barabash et al. ............. 718/102  
5,553,246 A * 9/1996 Suzuki ......................... 710/107  
6,085,218 A * 7/2000 Carmon ....................... 718/107

(Continued)

FOREIGN PATENT DOCUMENTS

JP 9-231181 9/1997  
JP 2000-112773 4/2000

(Continued)

OTHER PUBLICATIONS

International Search Report issued Apr. 26, 2011 in International (PCT) Application No. PCT/JP2011/000325.

*Primary Examiner* — Eric C Wai  
(74) *Attorney, Agent, or Firm* — Wenderoth, Lind & Ponack, L.L.P.

(57) ABSTRACT

A multiprocessor system includes a plurality of processors, each including a task scheduler that determines a task execution order of tasks in a task set to be executed by the processors within a task period which is defined as a period in repeated execution of the task sets; and a scheduler management device having a command unit configured to issue a command for at least one of the task schedulers to change the task execution order, wherein each of the at least one of the task schedulers, when receiving the command from the command unit, changes the task execution order of the corresponding processor.

13 Claims, 18 Drawing Sheets

(56) References Cited

U.S. PATENT DOCUMENTS

| | | | |
|---|---|---|---|
| 6,564,274 B1 * | 5/2003 | Heath et al. | 710/105 |
| 8,370,846 B2 * | 2/2013 | Hayashi | 718/108 |
| 8,468,324 B2 * | 6/2013 | Chen et al. | 712/205 |
| 2004/0216110 A1 * | 10/2004 | Noll et al. | 718/102 |
| 2005/0060709 A1 | 3/2005 | Kanai et al. | |

FOREIGN PATENT DOCUMENTS

| | | |
|---|---|---|
| JP | 2002-73354 | 3/2002 |
| JP | 2005-43959 | 2/2005 |
| JP | 2007-226587 | 9/2007 |

* cited by examiner

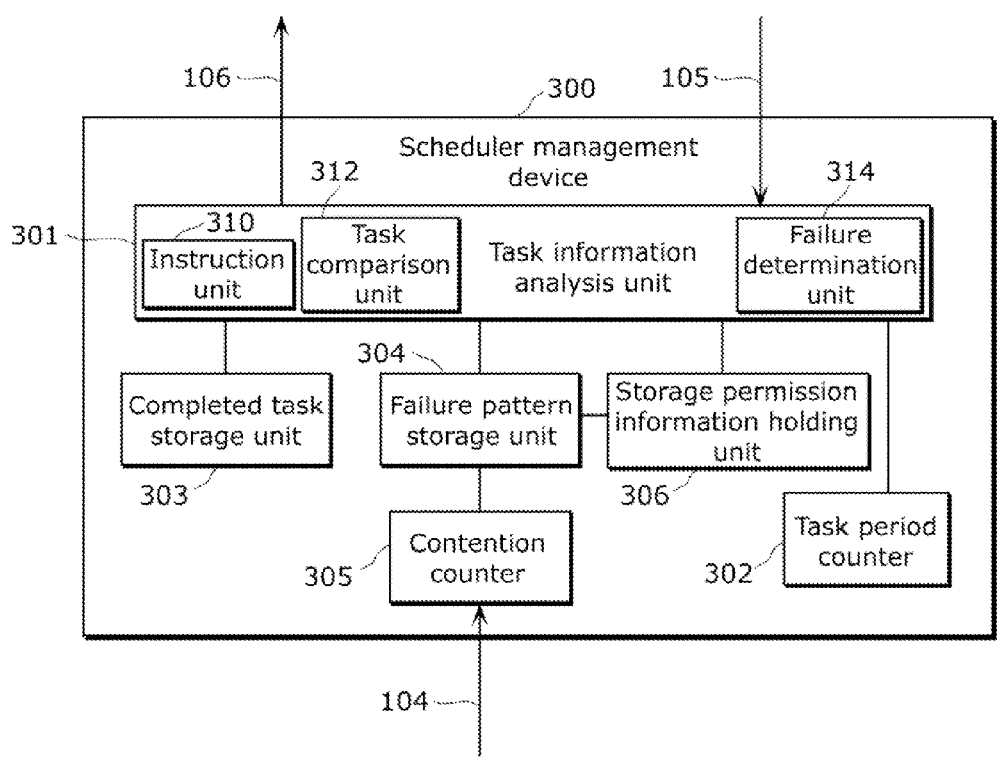

MULTIPROCESSOR SYSTEM FOR COMPARING EXECUTION ORDER OF TASKS TO A FAILURE PATTERN

CROSS REFERENCE TO RELATED APPLICATIONS

This is a continuation application of PCT International Application No. PCT/JP2011/000325 filed on Jan. 21, 2011, designating the United States of America, which is based on and claims priority of Japanese Patent. Application No. 2010-151533 filed on Jul. 2, 2010. The entire disclosures of the above-identified applications, including the specifications, drawings and claims are incorporated herein by reference in their entirety.

FIELD

The present invention relates to a multiprocessor system, and particularly to a multiprocessor system which repeatedly executes a task set including a plurality of tasks.

BACKGROUND

Conventionally, there has been known a technology for scheduling a plurality of tasks so as to complete the tasks within a predetermined limited time.

For example, Japanese Unexamined Patent Application Publication No. 2002-73354 discloses a technology in which the number of events is recorded for each task, the events being such that the time it took for the task to be executed by a processor exceeded (deadline miss) a predetermined limited time in the past. For a task having a greater number of such events, a higher execution priority is given to the task at the time of scheduling so as to try to reduce the number of deadline misses.

CITATION LIST

Patent Literature

Japanese Unexamined Patent Application Publication No. 2002-73354

Technical Problem

However, in the conventional multiprocessor system in which a plurality of processors is executed in coordination, a task failure due to confliction between processors for access to a shared resource cannot be prevented. As a result, a real-time performance cannot be guaranteed for such a system.

FIG. 20 illustrates a time chart example of a task failure due to confliction between processors for access to a shared resource (for example, shared memory) in a multiprocessor system.

As illustrated in FIG. 20, as a consequence of confliction for simultaneous access to a shared resource during task processing executed by each processor (denoted as task processing 320 by processor 0 and task processing 330 by processor 1 in FIG. 20), the task is not completed within an estimated time period, thereby causing a processing failure.

More particularly, bus access confliction has occurred between task A331 in execution on processor 1 and task 0321 in execution on processor 0.

Consequently, in order to execute task A331, processor 1 must wait until the bus access by task C321 is completed. Because of the waiting time, it takes a longer time than originally estimated for processor 1 to execute task A331.

Consequently, the processing of task B332, which is expected to be completed by processor 1 before the subsequent switching between task contexts, cannot be completed within a task period 222, and thus execution of task B332 fails.

FIG. 21 illustrates an example of task processing delay caused by access confliction between processors in a multiprocessor system.

As illustrated in FIG. 21, in the case where task A1 and task B1 frequently perform write processing to the shared resource (a shared memory 102 in FIG. 21), confliction frequently occurs between tasks, and consequently, the processing time of task. A1 and task B1 is extended, and thus the efficiency in task processing by processor 0 and processor 1 is reduced.

That is to say, although an ideal task processing time may be previously estimated theoretically, access confliction to the shared resource such as a shared memory in a multiprocessor system is not assumed in the conventional technology. Because of this, when real-time processing is required, it is difficult to guarantee real-time performance.

SUMMARY

The present invention solves the above-described conventional problem, and particularly, it is an object of the invention to provide a multiprocessor system which repeatedly executes task sets each including a plurality of tasks, the multiprocessor system being able to previously detect a schedule for which execution of tasks scheduled to be completed within a task period cannot be completed within the task period because of access confliction, and to avoid a task processing failure so as to reliably guarantee the performance for real-time processing.

Solution to Problem

In order to achieve the above-described object, an aspect of the present invention provides a multiprocessor system which repeatedly executes task sets, each including a plurality of tasks, the multiprocessor system including: a plurality of processors, each including a task scheduler that determines a task execution order of the tasks in a task set to be executed by the processors within a task period which is defined as a period in repeated execution of the task sets, and processors that execute the respective tasks; and a scheduler management device having a command unit configured to issue a command for at least one of the task schedulers to change the task execution order, wherein each of the task schedulers, when receiving the command from the command unit, changes the task execution order of the processors.

With the above configuration, the execution order of the tasks to be executed by the processors is changed based on a command from the scheduler management device. Consequently, a difference occurs between execution times of tasks which have access such as writing to the same common resources, and thus access confliction and a failure in task processing can be avoided.

More preferably, the scheduler management device further includes a task comparison unit and a failure pattern storage unit, the failure pattern storage unit is configured to store, as failure patterns, one or more pieces of information including a task execution order of tasks, processor ID of each of processors which execute the respective tasks, and a task period which are included in a task set, the task set such that task set processing, which is per-period processing in repeated execution of the task sets, is not completed within the task period due to access confliction between processors, a first task scheduler of the task schedulers notifies the task comparison unit of periodic scheduling information which includes, in a task set, (i) a task execution order of tasks, (ii) processor ID of each of is processors which execute the respective tasks, and (iii) a task period, the task comparison unit is configured to determine whether or not the periodic scheduling information notified matches one of the failure patterns by comparing the periodic scheduling information notified with the failure patterns, and when the periodic scheduling information notified matches one of the failure patterns, the command unit is configured to issue a command for at least one of the task schedulers to change the task execution order included in the periodic scheduling information.

With the above configuration, the scheduler management device stores failure patterns in the failure pattern storage unit, the failure patterns each being a task execution order with which task processing fails. Therefore, by the task information analysis unit comparing the execution order of the tasks determined by the scheduler with the failure patterns, the scheduler management device can detect a schedule which fails before executing the tasks. Furthermore, in the case of a failure, the scheduler management device commands a scheduler to perform rescheduling by changing the execution order of the tasks. Consequently, a task processing failure can be avoided beforehand.

Specifically, the scheduler management device determines whether or not a task set processing is completed within the task period, the task set processing being per-period processing in repeated execution of the task sets, and when it is determined that the task set processing is not completed within the task period, the command unit is configured to issue a command for the at least one of the task schedulers to change the task execution order.

More specifically, the scheduler management device further includes a task period counter, a completed task storage unit, and a failure determination unit, each of the processors notifies the scheduler management device of task identification information of a task for which the task set processing is completed, a task set processing being per-period processing in repeated execution, the completed task storage unit is configured to store the task identification information of the task for which the task set processing notified is completed, the task period counter counts a number of cycles since the processors start execution of the task set, the failure determination unit is configured to determine whether or not a failure task is present which is not stored in the completed task storage unit at a moment when the number of cycles exceeds the task period, the failure task being one of the tasks in the task set, and when the determination indicates that at least the failure task is present, the command unit is configured to issue a command for at least one of the task schedulers to change the task execution order.

In addition, the scheduler management device further includes a failure pattern storage unit and a task comparison unit, in the case where the failure determination unit determines that a failure task is included in an executed task set, the scheduler management device stores, in the failure pattern storage unit, as a failure pattern, information including a task execution order of tasks contained in the task set, processor ID of each of processors which execute the respective tasks, and a task period which are included in the task set, a first task scheduler of the task schedulers notifies the task comparison unit of periodic scheduling information which includes a task execution order of tasks included in a task set to be executed, a processor ID of a processor which executes corresponding one of the tasks, and the task period, the task comparison unit is configured to determine whether or not the periodic scheduling information notified matches one of the failure patterns by comparing the periodic scheduling information notified with the failure patterns, and when the periodic scheduling information notified matches one of the failure patterns, the command unit is configured to issue a command for at least one of the task schedulers to change the task execution order contained in the periodic scheduling information.

Thus, the scheduler management device learns execution orders of tasks with which task processing fails from failure cases of task processing. Consequently, the scheduler management device can automatically update the failure patterns to be stored in the failure pattern storage unit.

In addition, the command to change the task execution order may contain task identification information of the at least the failure task, and the one of the task schedulers which has received the command may change the task execution order, so that a task corresponding to the task identification information has an execution priority lower than an execution priority of another task to be executed by a processor which executes the task corresponding to the task identification information.

Thus, particularly a certain task for which task processing has failed can be designated, and the execution priority of the certain task can be made lower than that of another task to be executed by the same processor. Consequently, the execution time of a task which causes access confliction can be delayed at the time of rescheduling after a task processing failure so as to avoid confliction, and thus a task failure can be avoided at the subsequent task execution.

In addition, the multiprocessor system may further includes: a shared bus having a bus controller; and a shared resource in which the processors write information via the shared bus, wherein the bus controller includes a holding unit configured to hold task identification information of two or more confliction tasks which are write operations scheduled to be performed on the shared resource by the respective processors on overlapping time intervals, and the command unit includes, in the command to change the task execution order, the task identification information of the confliction tasks held in the holding unit, the confliction tasks each being the failure task.

The shared resource may be one of a shared memory and an input/output interface.

Thus, when task processing fails, a case where the task processing failure is caused by access confliction can be identified based on the information from the shared bus. Change of task execution order is primarily effective in avoiding confliction for access to the shared resource. Consequently, by identifying a task which has failed because of access confliction and changing the execution priority of the task, a task processing failure can be reliably avoided in the next task execution.

The present invention may be achieved not only as a multiprocessor system, but also as an information processing method which includes steps defined by the operations of distinctive units included in the multiprocessor system, or as a program which causes a computer to execute such distinctive steps. It is needless to state that such a program can be distributed via a recording medium such as a CD-ROM or a transmission medium such as the Internet.

In addition, the present invention may be achieved as a system LSI including such a multiprocessor system.

Advantageous Effects

In a multiprocessor system which repeatedly executes a task set including a plurality of tasks, a schedule for which execution of tasks cannot be completed within the task period due to access confliction can be previously detected so as to avoid a task processing failure, thereby being able to provide a multiprocessor system which reliably guarantees the performance for real-time processing.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 3 is a configuration diagram of a scheduler management device in Embodiment 1 of the present invention.

FIG. 4 is a table illustrating exemplary periodic scheduling information according to Embodiments 1 to 3 of the present invention.

DESCRIPTION OF EMBODIMENTS

Hereinafter, a multiprocessor system 100 in an embodiment of the present invention will be described with reference to the accompanying drawings.

Embodiment 1

Figure 1:
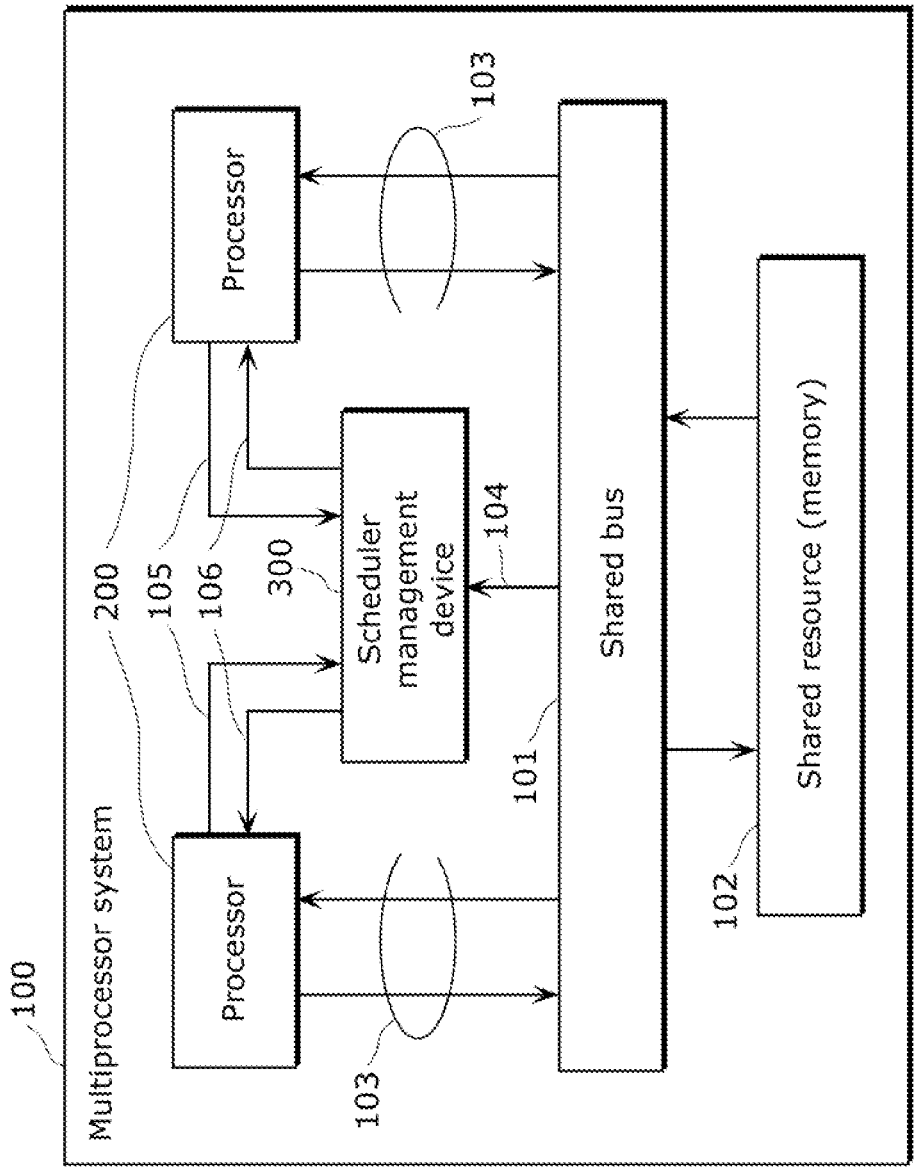
FIG. 1 is a configuration diagram of a multiprocessor system in Embodiment 1 of the present invention.

FIG. 1 is a configuration diagram of a multiprocessor system 100 in Embodiment 1 of the present invention. The multiprocessor system 100 is a multiprocessor system which repeatedly executes a task set including a plurality of tasks.

As illustrated in FIG. 1, the multiprocessor system 100 includes two processors 200 with a virtual multi-task processing mechanism, a shared bus 101, a shared resource 102, and a scheduler management device 300.

More specific description is as follows: the processors 200 are each connected to the shared bus 101 via a bus access 103, and can be accessed to the shared resource 102 via the shared bus 101.

As the shared resource 102, for example, a shared memory or an I/O interface for input/output may be used.

The processors 200 are each connected to the scheduler management device 300 via an analysis result bus 106 and a task information bus 105. The two processors included in the multiprocessor system 100 are collectively called "processor 200."

Access confliction information detected on the shared bus 101 is transmitted to the scheduler management device 300 via an access confliction bus 104.

The scheduler management device 300 analyzes task information received from each of the processor 200 via the task information bus 105, and transmits an analysis result of access confliction to each of the processor 200 via the analysis result bus 106.

The processor 200 which has received the analysis result of access confliction from the scheduler management device 300 performs task scheduling necessary for each of the processor 200 (i.e., a plurality of processors in the processor 200) so as to avoid access confliction, and thus avoids a processing failure on the following scheduling.

Figure 2:
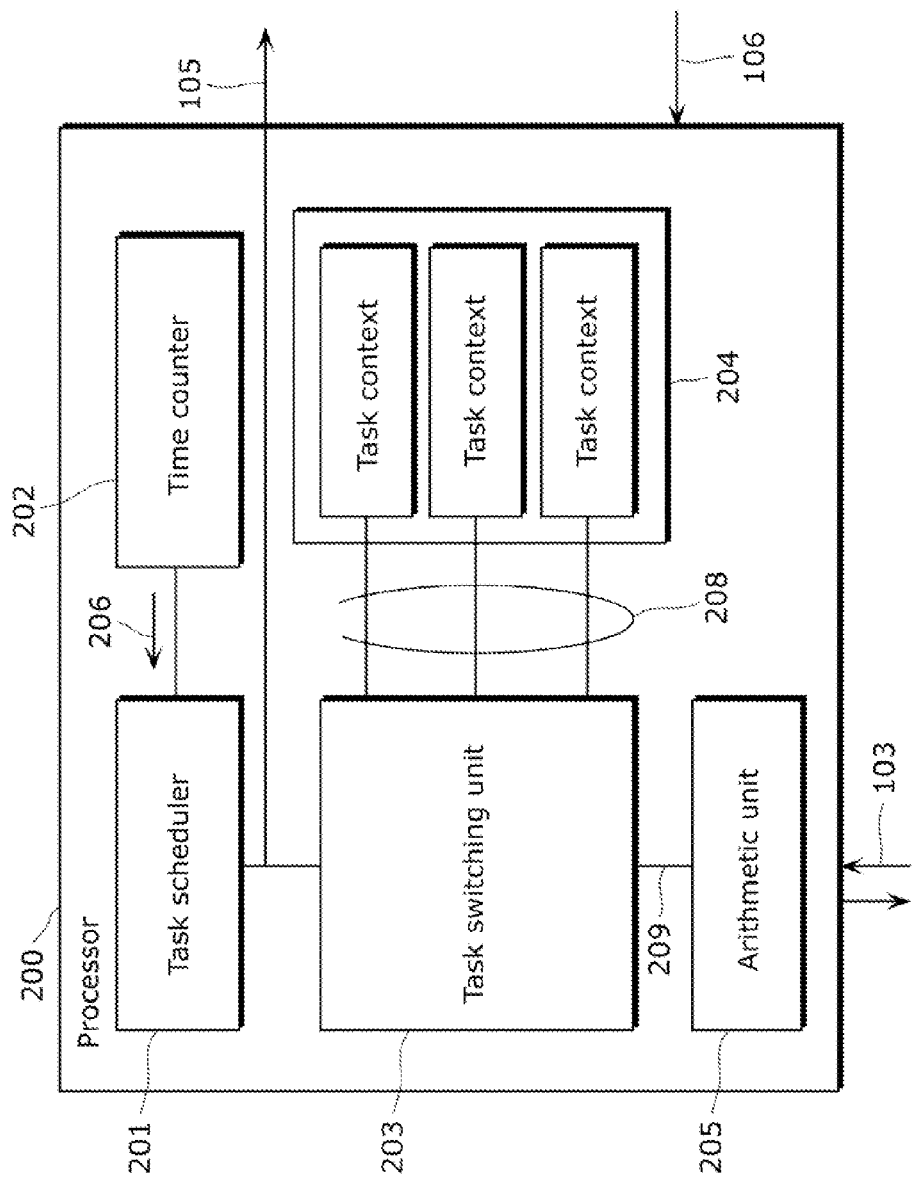
FIG. 2 is a configuration diagram of a processor in Embodiment 1 of the present invention.

FIG. 2 is a configuration diagram of the processor 200 having a virtual multi-task processing mechanism in Embodiment 1 of the present invention.

As illustrated in FIG. 2, the processor 200 includes a task scheduler 201, a time counter 202, a task switching unit 203, a task context 204, and an arithmetic unit 205.

The task scheduler 201 switches between the task contexts 204 tri assigned to the arithmetic unit 205 using the task switching unit 203, and completes processing of a plurality of tasks within a predetermined time period.

When the task context 204 is switched, the time counter 202 is initialized.

The task scheduler 201 is connected to the time counter 202 and the task switching unit 203.

The task scheduler 201 receives a remaining task execution time 206 from the time counter 202. When the value of the remaining task execution time 206 becomes zero, the task scheduler 201 generates task information including a task ID, a process ID, a processor ID, a task priority, and transmits the task information to the task switching unit 203.

Simultaneously, the task scheduler 201 transmits the task information to the scheduler management device 300 via the task information bus 105.

The task switching unit 203 receives the task information from the task scheduler 201, selects and acquires necessary task context 204 via a task context connection bus 208, and supplies the task context to the arithmetic unit 205 connected via an arithmetic unit connection bus 209.

The arithmetic unit 205 performs arithmetic based on the task context supplied from the task switching unit 203, and consequently starts access to the shared bus 101 via the bus access 103.

FIG. 3 is a configuration diagram of the scheduler management device 300 in Embodiment 1.

As illustrated in FIG. 3, the scheduler management device 300 includes a task information analysis unit 301, a task period counter 302, a completed task storage unit 303, a failure pattern storage unit 304, a confliction counter 305, and a storage permission information holding unit 306.

The task information analysis unit 301 is connected to the processor 200 via the task information bus 105, and receives task information obtained from each of the processor 200 (for example, a task completion notification, a task ID, a scheduling completion notification, and periodic scheduling information including task attributes, execution order of tasks, the processor ID of a processor which performs each task, a task priority, a task period of a plurality of tasks contained in a task set to be performed within a task period).

Here, the task set includes a plurality of tasks, and defines a set of tasks to be executed as a unit repeatedly by the processor 200.

The task period is a predetermined time period which is defined as a period of repeated execution of task sets.

The task information analysis unit 301 is connected to the task period counter 302, the completed task storage unit 303, the failure pattern storage unit 304, and the storage permission information holding unit 306.

The task information analysis unit 301 has a command unit 310, a task comparison unit 312, and a failure determination unit 314.

The task comparison unit 312 compares periodic scheduling information acquired via the task information bus 105 with a failure pattern acquired from the failure pattern storage unit 304.

Here, the failure pattern is a record of past periodic scheduling information 220 which indicates that execution of all the tasks contained in a task set was not completed within a task period and thus failed.

In the case where the failure pattern includes the acquired periodic scheduling information 220 as a result of the comparison by the task comparison unit 312, the command unit 310 commands each of the processor 200 to change scheduling, via the analysis result bus 106.

Each of the processor 200 which has received the command of scheduling change performs task rescheduling such as schedule cancellation, pending, increment/decrement of the time counter of a specific task, in addition to the change of task execution order, and transmits new periodic scheduling information 220 and a scheduling completion notification to the task information analysis unit 301 via the task information bus 105.

The task comparison unit 312 and the command unit 310 repeat the above process until the task execution order contained in the periodic scheduling information 220 does not match with the failure pattern stored in the failure pattern storage unit 304.

The failure determination unit 314 determines whether or not all the tasks to be processed within one task period have been completed.

Specifically, when the task period counter 302 overflows (or underflows when a down counter is used), the failure determination unit 314 determines whether or not the task completion notification sent from the processor 200 is stored in the completed task storage unit 303 for each task contained in a task set.

When a corresponding task completion notification is stored in the completed task storage unit 303 for each of all the tasks contained in the task set, the failure determination unit 314 determines that the entire task processing within the task period has been completed. Subsequently, the command unit 310 makes a scheduling request to the processor 200 again as needed in order to perform the next task set.

On the other hand, when there is at least one task for which a task completion notification has not been recorded, the failure determination unit 314 determines that the task processing has failed.

In this case, the task information analysis unit 301 stores the periodic scheduling information and the number of conflictions into the failure pattern storage unit 304, the number of conflictions being retrieved from the confliction counter 305 for each task contained in the task set. The command unit 310 notifies the processor 200 of a scheduling change command, which is a command of a request for rescheduling.

The task scheduler 201 in the processor 200 which has received a request for rescheduling upon a scheduling change command notifies the task information analysis unit 301 of, for example, a modified execution order of the tasks contained in failed periodic scheduling information as new periodic scheduling information after rescheduling.

The task scheduler 201 which has performed rescheduling notifies the other processors 200 of the new periodic scheduling information.

The task period counter 302 is a counter which measures the execution cycle of the processor 200 for a task contained in a task set.

The task information analysis unit 301, when causing the processor 200 to start execution of a task set, initializes the task period counter 302 to start counting, and simultaneously, cancels the scheduling change request which has been sent to the processor 200 via the analysis result bus 106.

Here, initialization of the task period counter 302 is to reset the counter value to the initial value of the counter, the counter value being an overflow value of the task period counter 302 after an elapsed time of a task period.

For example, if the maximum value of the task period counter 302 is 255 and the task period is 50, the initial value of the task period counter 302 is set to 205.

Subsequently, the processor 200 starts processing of a scheduled task.

While the processor 200 performs the task processing, the task period counter 302 continues counting up (or counting down until the counter underflows when a down counter is used) in the task period until the counter overflows.

After the overflow, the task period counter 302 notifies the failure determination unit 314 that the task period has elapsed.

As described above, for each task contained in the task set, the completed task storage unit 303 stores a result as to whether the task has been completed.

More specifically, the completed task storage unit 303 assigns the tasks to respective bits of the register and initialized the bits to 0, and sets a corresponding assigned bit to 1 each time a task completion notification outputted from the processor 200 is received. In this manner, a task completion notification can be recorded.

The task completion notification can be outputted, for example, when hardware satisfies any user-defined conditions such as having a less overflow value set in the counter. In addition to the any conditions, a task completion notification can be outputted, for example, by a user executing a command code written in a program for informing of a task completion, and thus a programmable task processing completion control by a user can be achieved.

The failure pattern storage unit 304 stores the above-described failure pattern.

The confliction counter 305 is connected to the shared bus 101 via the access confliction bus 104, and counts and holds the number of conflictions that occurred for each task when a plurality of tasks performed by respective processors 200 have each access to the shared bus 101 simultaneously.

The storage permission information holding unit 306 holds storage permission information which is the conditions applied when a failure pattern is stored in the failure pattern storage unit 304.

As the storage permission information, example, designation of permission start time may be used. In this case, the failure pattern storage unit 304 cancels the failure patterns discards the permission start time.

An exclusive task may be designated as the storage permission information. In this case, the failure pattern storage unit 304 does not store the failure of a task which has task identification information designated as an exclusive task.

A maximum storage number of the failure pattern may be designated as the storage permission information. In this case, the failure pattern storage unit 304 manages the number of failure patterns to be stored in accordance with a rule such as a FIFO (First In First Out).

The failure patterns stored in failure pattern storage unit 304 may be stored in a compressed format as needed. In addition, not only a combination of task as a failure factor causing confliction, but also e.g., bus access information causing the confliction may be directly recorded as a failure pattern.

Thus, a possibility of a task failure can be determined based on a monitored state of the access to the shared bus 101 in addition to the task combination. A user may refer to and use the failed task storage information as desired.

That is to say, the multiprocessor system 100 according to the present embodiment is a multiprocessor system which repeatedly executes a task set including a plurality of tasks. Each of a plurality of processors (i.e., each of the processor 200) of the multiprocessor system 100 has the task scheduler 201 which determines an execution order of the tasks contained in a task set to be performed by the processors within the time period defined as a period of repeated execution of task sets, and a processor which performs each task.

In addition, the multiprocessor system 100 includes the scheduler management device 300 which has the command unit 310 configured to command at least one of a plurality of task schedulers 201 to change the task execution order.

Upon receiving a command from the command unit 310, each of the task schedulers 201 changes the task execution order of a plurality of processors.

Specifically, the scheduler management device 300 further includes the task comparison unit 312 and the failure pattern storage unit 304.

The failure pattern storage unit 304 stores, as a failure pattern, at least one set of an execution order of tasks, the processor ID of the processor which performs each task, and information including the task period, the execution order of tasks being contained in a task set in which per-period task set processing in repeated execution of task sets has not been completed within a task period because of access confliction of a plurality of processors.

A first task scheduler in the task schedulers 201 notifies the task comparison unit 312 of an execution order of the tasks contained in a task set, the processor ID of the processor which performs each task, and periodic scheduling information including the task period.

The task comparison unit 312 compares the task execution notified with the failure patterns sequence so as to determine whether or not the task execution order matches with one of the failure patterns.

In the case where a matched failure pattern is found as a result of the determination made by the task comparison unit 312, the command unit 310 commands at least one of the task schedulers 201 to change the task execution order contained in the periodic scheduling information.

On the other hand, in the case where a matched failure pattern is not found, the scheduler management device 300 causes the processor 200 to start execution of the task set.

Subsequently, the scheduler management device 300 determines whether or not the task set processing has been completed within a task period 222. In the case where it is determined that the task set processing has not been completed within the task period 222, the command unit 310 commands the task schedulers 201 to change the task execution order.

More specifically, the scheduler management device 300 further includes the task period counter 302, the completed task storage unit 303, and the failure determination unit 314.

Each of the processor 200 notifies the scheduler management device 300 of the task identification information of the tasks for which the per-period processing in repeated execution has been completed.

The completed task storage unit 303 stores the task identification information notified of the task for which the per-period processing in repeated execution has been completed.

The task period counter 302 counts the number of cycles after the processor 200 starts execution of a task set.

The failure determination unit 314 determines whether or not there exists a failed task which is not stored in the completed task storage unit 303 and yet is one of a plurality of tasks contained in a task set at the time when the number of cycles exceeds the task period 222.

When there is one or more failed tasks as a result of the determination, the command unit 310 commands at least one of the task schedulers 201 to change the task execution order.

When it is determined that there is at least one failed task, the scheduler management device 300 stores failed periodic scheduling information 220 as a new failure pattern into the failure pattern storage unit 304.

A scheduling change command 230, which is a command of change of task execution order, contains task identification information of one or more failed tasks, and the task scheduler which has received the command changes the task execution order, so that the execution priority of a task corresponding to the task identification information contained in the command comes after the execution order of any other task which is performed by the same processor.

The task period counter 302 can be achieved using a register, for example. In that case, the event that the execution cycle of the processor 200 exceeds the task period is implemented as an interrupt associated with an overflow of the counter.

Hereinafter, more detailed description is given.

FIG. 4 illustrates an example of periodic scheduling information 220 which is transmitted from the task scheduler 201 to the task information analysis unit 301 via the task information bus 105.

As illustrated in FIG. 4, the periodic scheduling information 220 includes a task period 222, an execution order 224 of processor 0, and an execution order 226 of processor 1.

The task period 222 is a time interval within which per-period processing in repeated execution of all tasks contained in a task set (a set consists of three tasks; task A, task B, and task C in this example) should be completed.

For example, in the case where the task period 222 is designated to be 20 cycles, when the execution cycle of the task set exceeds 20 cycles, the execution of the task fails.

The execution order 224 of processor 0, and the execution order 226 of processor 1 indicate the execution order of tasks to be performed by the respective processors.

For example, in the case where the execution order 226 of processor 1 is such that task A is designated to be the first task, and task B is designated to be the second task, processor 1 starts execution of task A first, and after completing task A, processor 1 executes task B.

In the case where only task C is designated as in the execution order 224 of processor 0, processor 0 executes task C.

Figure 5:
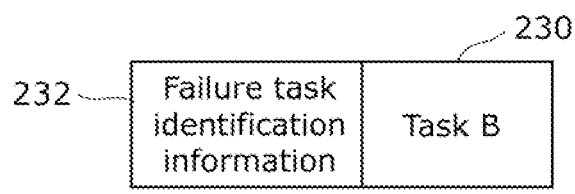
FIG. 5 is a table illustrating an exemplary rescheduling command according to Embodiments 1 to 3 of the present invention.

FIG. 5 is a table illustrating an example of the scheduling change command 230 sent from the command unit 310 to the task scheduler 201 for requesting the change of a task execution order.

As illustrated in FIG. 5, the scheduling change command 230 contains failure task identification information 232. Here, task B is designated as the failure task identification information 232.

For example, suppose that a task has failed after executing a task set based on the periodic scheduling information 220 illustrated in FIG. 4.

Subsequently, when task B is designated as the failure task identification information 232 in the scheduling change command 230 which is notified to the task scheduler 201 from the command unit 310, the task scheduler 201 lowers the execution priority of task B in the execution order 226 of processor 1.

Consequently, periodic scheduling information with the execution orders of task A and task B reversed is notified to the task information analysis unit 301 from the task scheduler 201.

The scheduling change command 230 does not need to contain the failure task identification information 232. In this case, the task scheduler 201 which has received the scheduling change command 230 may change the execution order of two tasks which are, for example, randomly selected from the tasks to be executed in the processor 200.

Alternatively, the task scheduler 201 may replace the task executed last with the task executed second to the last, both tasks belonging to the tasks to be executed in the processor 200.

The scheduling change command 230 by the command unit 310 can be achieved by an interrupt specifically.

The command unit 310 may notify all processors 200 of the scheduling change command 230, or notify only a specific processor of the scheduling change command 230 by designating an identifier.

Figure 6:
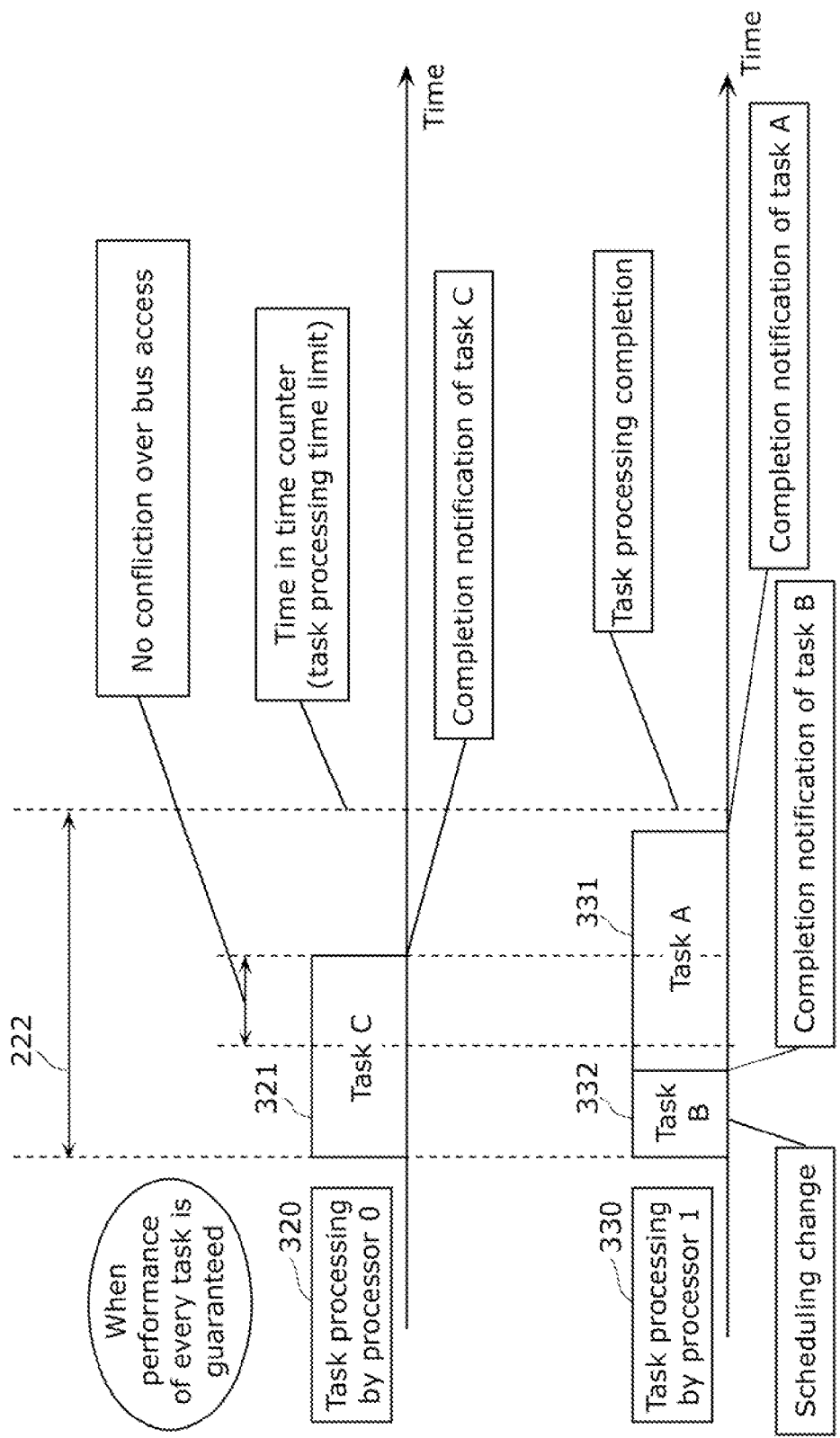
FIG. 6 is a diagram illustrating an example in which a task processing failure caused by access confliction can be avoided by the multiprocessor system according to Embodiments 1 to 3 of the present invention.

FIG. 6 is a diagram illustrating an example in which a task processing failure caused by access confliction to the shared resource 102 can be avoided by the multiprocessor system 100 according to the present embodiments.

Figure 20:
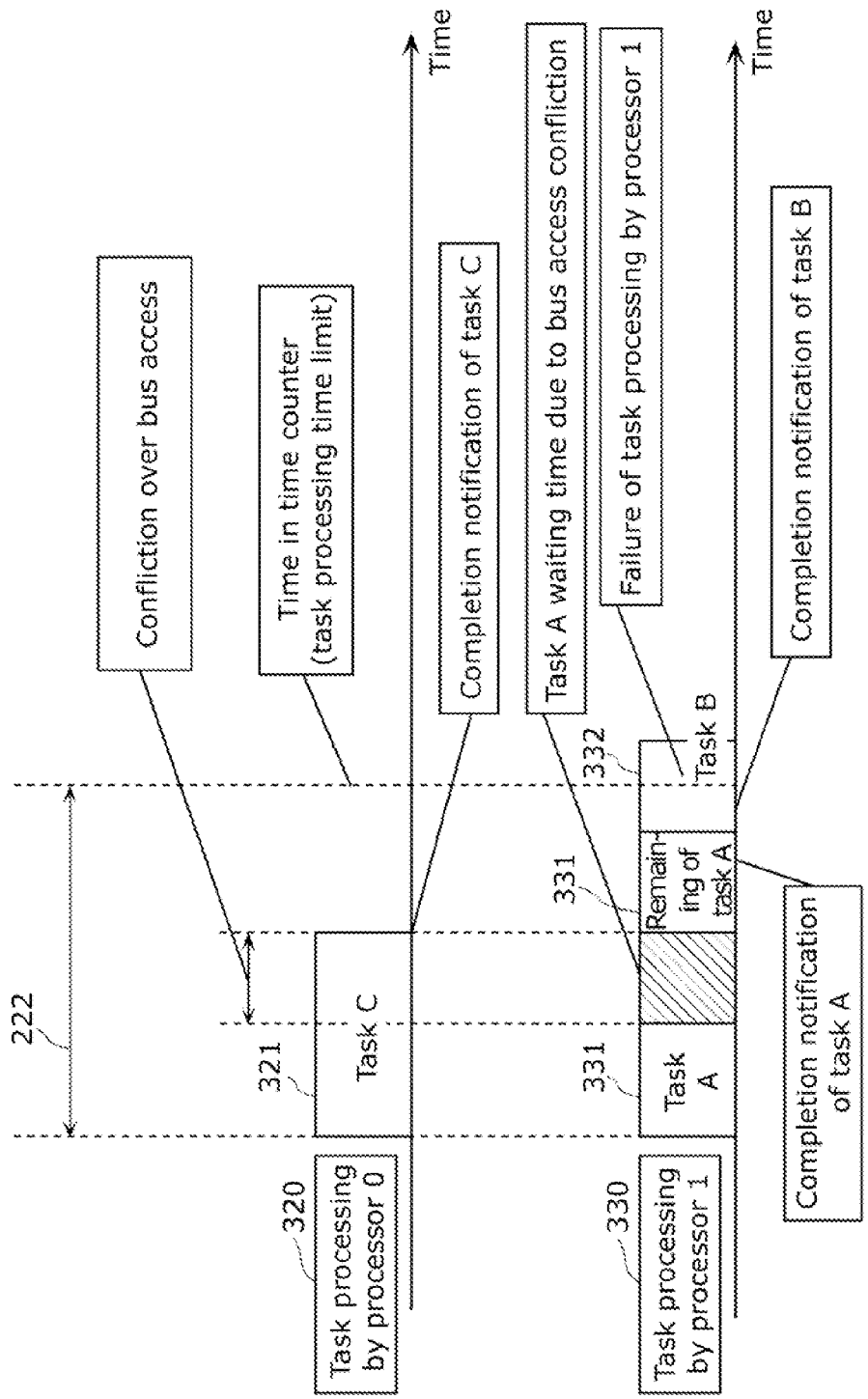
FIG. 20 is a diagram illustrating an example of a task processing failure in a conventional technology.
Figure 21:
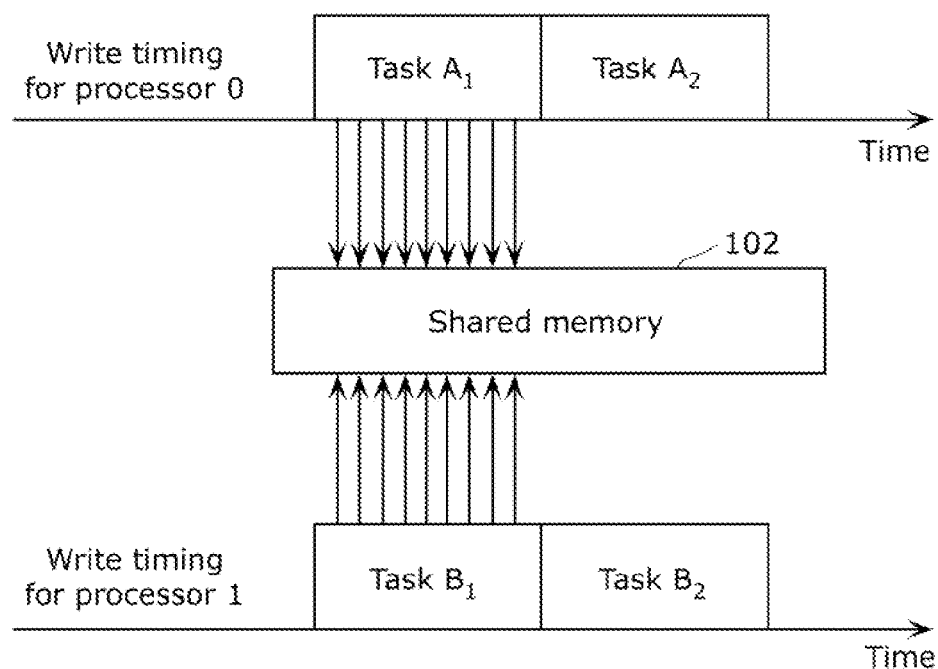
FIG. 21 is a diagram illustrating an example of a task processing delay in a conventional technology.

Similarly to FIG. 20, FIG. 6 illustrates a manner how a task set consisting of scheduled task A331, task B332, and task C321 are executed.

However, in FIG. 6, the task execution order is changed by the task scheduler 201, so that the execution order of task A and task B are reversed. Consequently, the access confliction between processor 0 and processor 1 is eliminated, and the per-period processing in repeated execution for all the tasks in the task set can be completed within the task period 222.

That is to say, according to the present embodiment with the above-described configuration, the periodic scheduling information 220 illustrated in FIG. 4, when applied, causes access confliction between task A331 in execution by processor 1 and task C321 in execution by processor 0, and consequently, a processing failure of task B332 scheduled to be executed by processor 1 can be detected beforehand.

Specifically, the task comparison unit 312 compares the periodic scheduling information 220 with the failure patterns stored in the failure pattern storage unit 304, and determines whether or not the periodic scheduling information 220 determined by the task scheduler 201 is contained in the failure patterns.

As a result, when the periodic scheduling information 220 determined by the task scheduler 201 is contained in the failure patterns, the task scheduler 201 performs rescheduling so as to change the order of task A331 and task B332. Thus, the bus access confliction between processor 0 and processor 1 is eliminated, thereby providing the effect that a processing failure of task B to be executed by processor 1 can be prevented.

All the information contained in the periodic scheduling information 220 does not necessarily need to be stored in the failure pattern storage unit 304 as failure patterns.

For example, at least task execution order should be stored.

In the case where a plurality of task sets exist and the task periods 222 vary with task sets, the task period 222 in addition to the task execution order is preferably stored in the failure pattern storage unit 304.

Figure 9:
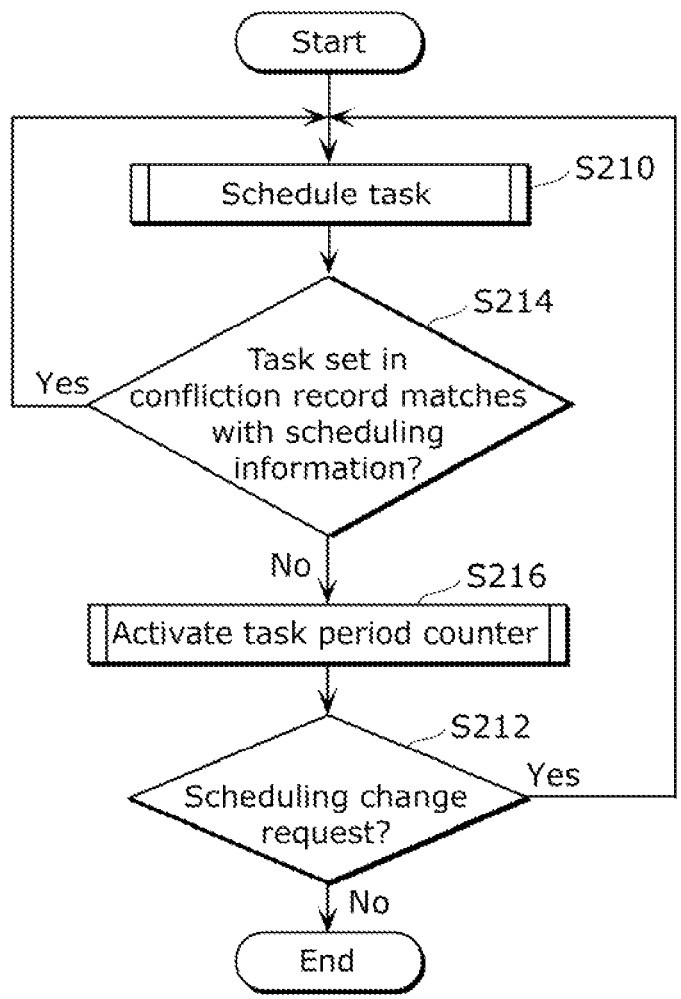
FIG. 9 is a flowchart illustrating the flow of task scheduling processing in Embodiment 1 of the present invention.

FIG. 9 is a flowchart illustrating the outline of task scheduling processing for a single task in Embodiment 1.

First, the task scheduler 201 of one of the processor 200 performs task scheduling (S210). As the result, the periodic scheduling information 220 is generated.

The generated periodic scheduling information 220 is sent to the task information analysis unit 301.

In the task information analysis unit 301, the task comparison unit 312 compares the periodic scheduling information 220 with the failure patterns stored in the failure pattern storage unit 304.

When a failure pattern matching with the sent periodic scheduling information 220 is found as a result of the comparison made by the task comparison unit 312, the command unit 310 in the task information analysis unit 301 notifies the task scheduler 201 of a scheduling change command 230 (Yes in S214).

Upon receiving the scheduling change command 230, the ask scheduler 201 performs task scheduling again (S210).

On the other hand, when the periodic scheduling information 220 does not match with one of the failure patterns (No in S214), the task information analysis unit 301 causes the task period counter 302 to start counting, and simultaneously, commands the processor 200 to execute the task set based on the scheduling according to the periodic scheduling information 220 notified to the processor 200 (S216).

Subsequently, the command unit 310 in the task information analysis unit 301 notifies the scheduling change command 230 to the task scheduler 201 in the case where the execution of the task set failed.

Upon receiving the scheduling change command (Yes in S212), the task scheduler 201 performs scheduling again for the failed task set (S210).

Figure 10:
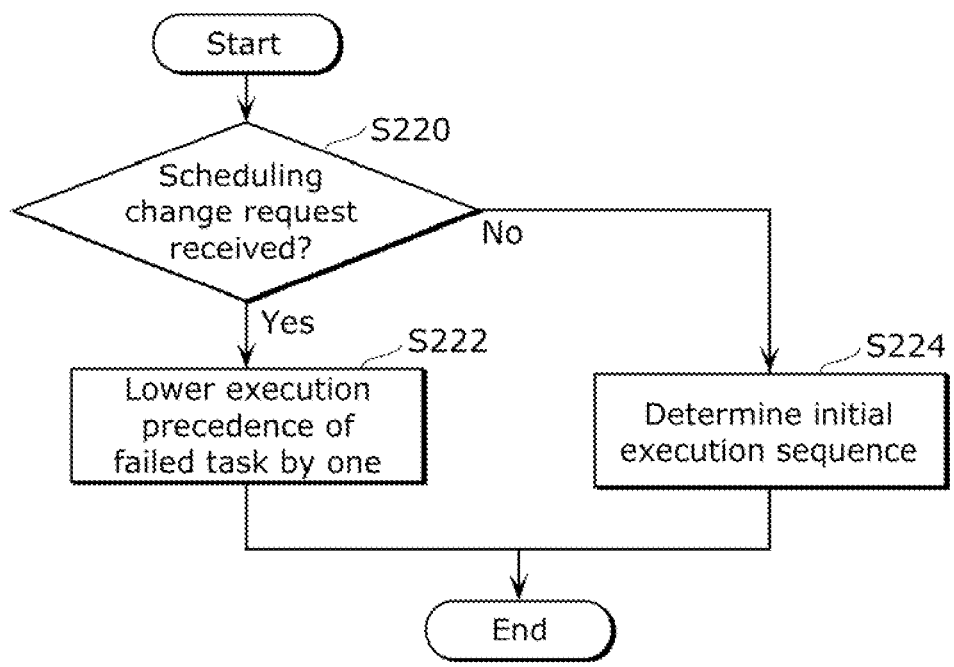
FIG. 10 is a flowchart illustrating the flow of detailed task scheduling processing in Embodiment 1 of the present invention.

FIG. 10 is a flowchart illustrating the flow of task scheduling processing performed by the task scheduler 201.

Upon receiving the scheduling change command 230 from the command unit 310 in the task information analysis unit 301 (Yes in S220), the task scheduler 201 changes the execution priority of the task corresponding to the failure task identification information 232 contained in the scheduling change command 230. More specifically, the task scheduler 201 lowers the priority of the corresponding task by one (S222).

On the other hand, for example, when execution of a task is completed without a task failure, and then another task set is executed for the first time, the task scheduler 201 performs scheduling using conventional technology without receiving a scheduling change command from the command unit 310 (No in S220) (S224).

In this case, the task scheduler 201 performs scheduling using a conventionally-known scheduling algorithm such as a LST (Least Slack Time), so that per-period processing for each of all the tasks contained in the task set is completed within the task period 222 (S224).

Figure 11:
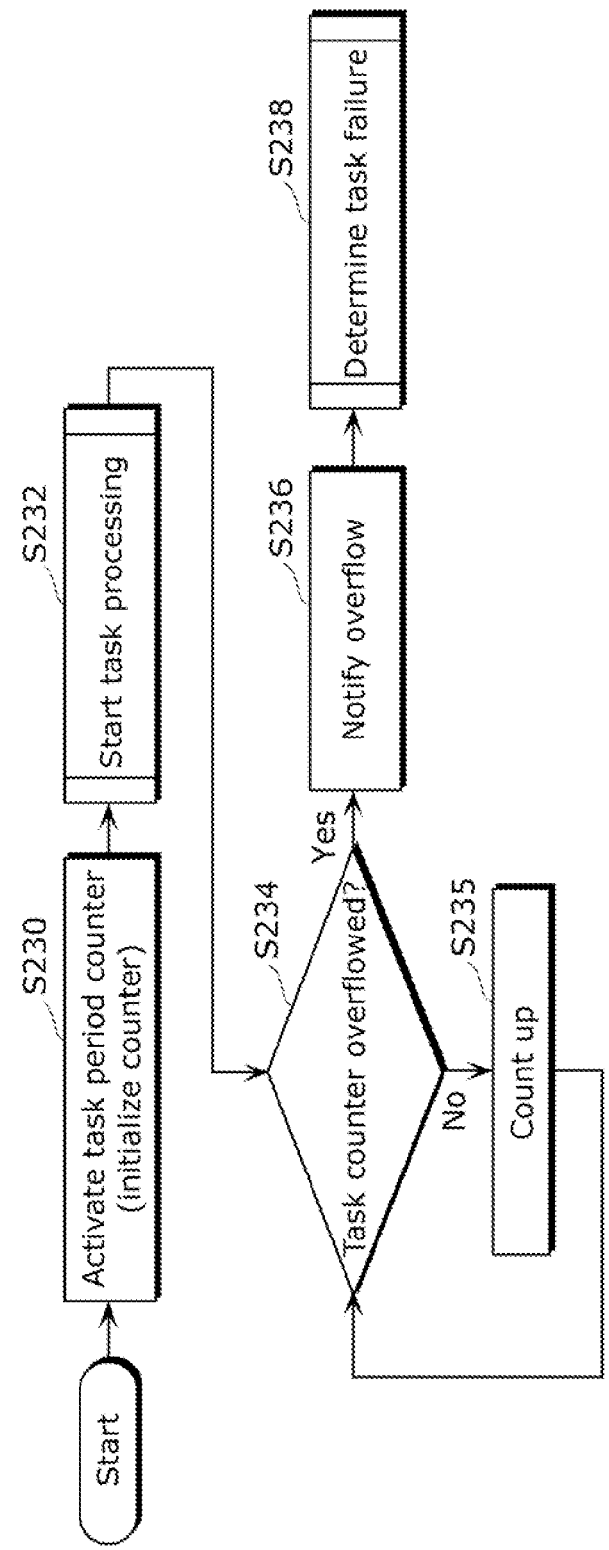
FIG. 11 is a flowchart illustrating the flow of per-period processing in repeated execution of a task set in Embodiment 1 of the present invention.

FIG. 11 is a flowchart illustrating the flow of per-period processing in repeated execution of task set in Embodiment 1.

The task period counter 302 activated by the task information analysis unit 301 first initializes its counter as described above (S230).

Simultaneously with the activation of the task period counter 302, the task information analysis unit 301 causes the processor 200 to start task processing (S232). However, instead of the task information analysis unit 301, the task period counter 302 may command the processor 200 to start processing.

Next, the task period counter 302 counts the number of cycles after commanding the processor 200 to start processing (S235).

The task period counter 302 continues to count until the counter overflows (No in S234).

Subsequently, when the count number exceeds (i.e., overflows) the maximum value of the counter (Yes in S234), the task period counter 302 notifies the failure determination unit 314 of the counter overflow (S236).

Subsequently, the failure determination unit 314 which has received the notification starts task failure determination processing (S238).

Figure 12:
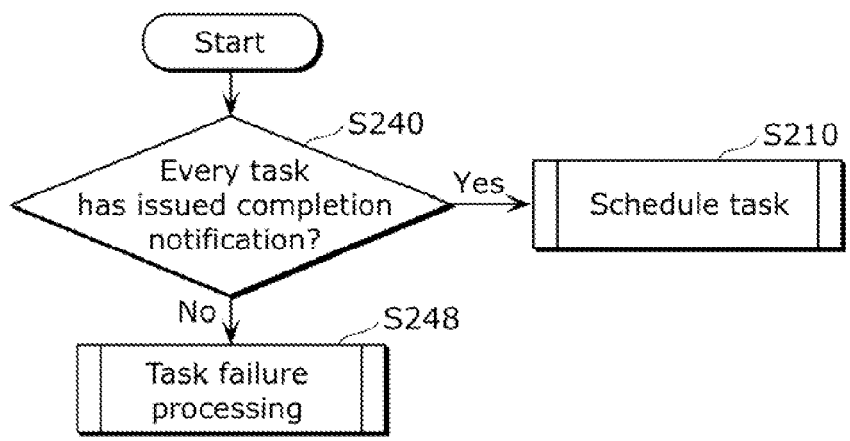
FIG. 12 is a flowchart illustrating the flow of task failure determination processing in Embodiment 1 of the present invention.

FIG. 12 is a flowchart illustrating the flow of task failure determination processing in Embodiment 1.

The failure determination unit 314 determines whether or not completion of all the tasks (that is to say, all the tasks contained in the task set currently executed) which are scheduled to be executed as per-period processing (that is to say, a task to be executed within the current task period 222) in repeated execution on the processor 200 is stored in completed task storage unit 303 (S240).

When all the tasks are completed (Yes in S240), the failure determination unit 314 determines that the processing to be executed in the current task period 222 are completed without a failure. The failure determination unit 314 requests the next task scheduling to each of the processor 200 via the analysis result bus 106 if necessary (No in S210, S220 of FIG. 10).

On the other hand, when no task completion notification is recorded in the completed task storage unit 303 (No in S240), the failure determination unit 314 determines that processing in the current task period 222 has failed, and starts task failure processing (S248).

Figure 13:
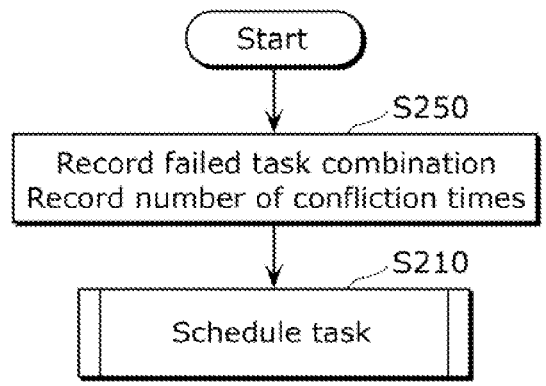
FIG. 13 is a flowchart illustrating the flow of task failure processing in Embodiment 1 of the present invention.

FIG. 13 is a flowchart illustrating the flow of task failure processing in Embodiment 1.

When the failure determination unit 314 determines that the is processing in the current task period 222 has failed, the task information analysis unit 301 stores the periodic scheduling information 220 in the failure pattern storage unit 304.

At the same time, the task information analysis unit 301 retrieves counted value of the number of conflictions that occurred in the current task period 222 for each task from the confliction counter 305 connected to the task information analysis unit 301 via the failure pattern storage unit 304, and stores the counted value in the failure pattern storage unit 304 (S250).

Next, the task information analysis unit 301 requests the second task scheduling via the analysis result bus 106 to the task scheduler 201 of each of the processor 200 in order to execute the task set containing failed task again (Yes in S210, S220 of FIG. 10).

Figure 14:
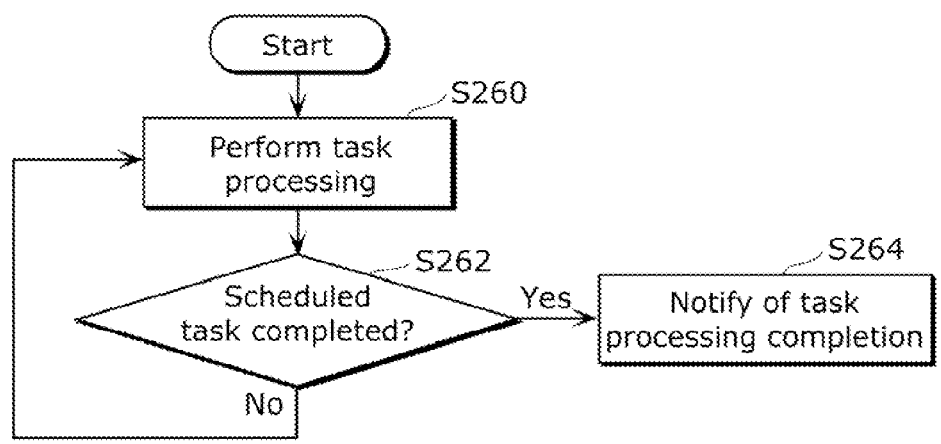
FIG. 14 is a flowchart illustrating the flow of task processing in Embodiment 1 of the present invention.

FIG. 14 is a flowchart illustrating the flow of task processing executed by the processor 200 in Embodiment 1.

As described above, simultaneously with the activation of the task period counter 302, the task information analysis unit 301 commands the processor 200 to start task processing (or withdraws a task scheduling request), then each of the processor 200 starts task processing (S260).

Each of the processor 200 continues to execute tasks unless the task processing assigned to itself as a result of scheduling is not completed (No in S262).

Every time the assigned task processing is completed (Yes in S262), each of the processor 200 notifies the task information analysis unit 301 of completion of the task via the task information bus 105 (S264).

Subsequently, the completed task storage unit 303 connected to the task information analysis unit 301 stores task completion or task failure for each task as described above.

As described above, according to the present embodiment, the task information analysis unit 301 compares the periodic scheduling information 220 of the task notified from the task scheduler 201 with the failure patterns stored in the failure pattern storage unit 304, and a failure due to access confliction between processors can be detected beforehand.

Consequently, by performing rescheduling to change the order of processing of failed task by the task scheduler 201, access confliction between the processors can be avoided, and thus a task processing failure can be avoided.

Embodiment 2

Hereinafter, a multiprocessor system 100 according to Embodiment 2 of the present invention will be described with reference to the accompanying drawings.

Figure 15:
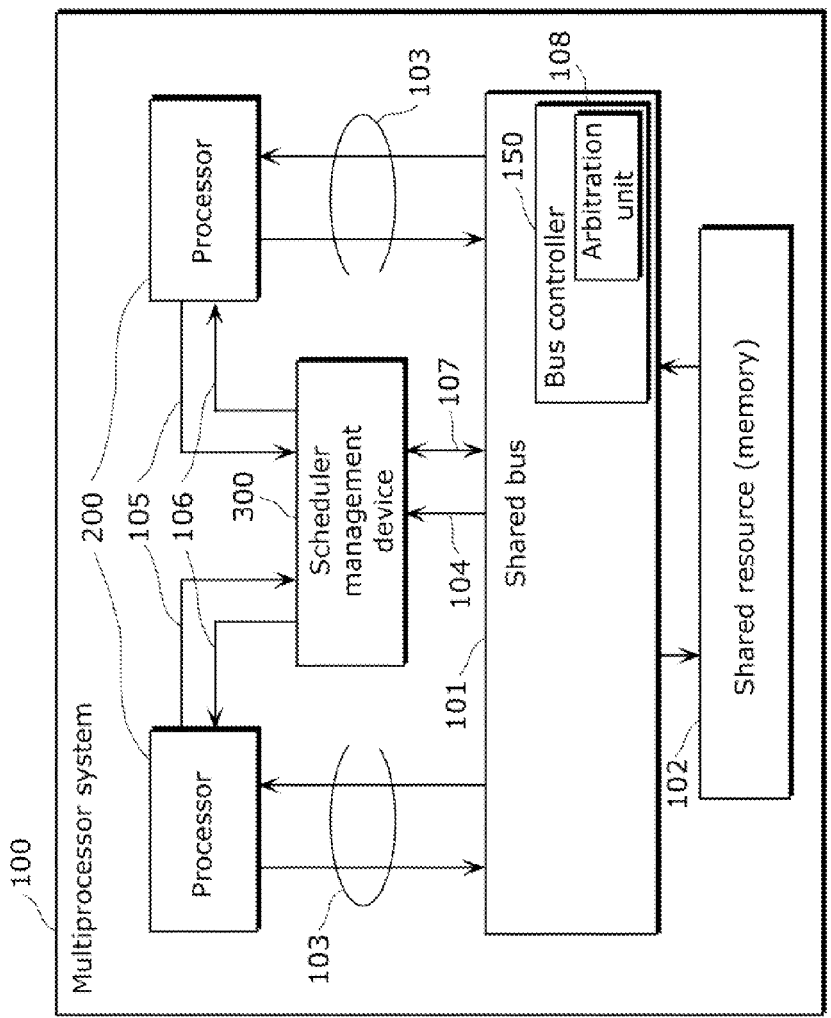
FIG. 15 is a configuration diagram of a multiprocessor system according to Embodiment 2 of the present invention.

FIG. 15 is a configuration diagram of the multiprocessor system 100 according to Embodiment 2 of the present invention.

In the present embodiment, the components similar to those of Embodiment 1 are labeled with the same reference symbols, and detailed description thereof is omitted.

The point of difference between Embodiment 2 illustrated in FIG. 15 and the above-described Embodiment 1 is that a bus controller 150 in Embodiment 2 includes an arbitration unit 108, and the multiprocessor system 100 includes an arbitration signal bus 107.

Figure 16:
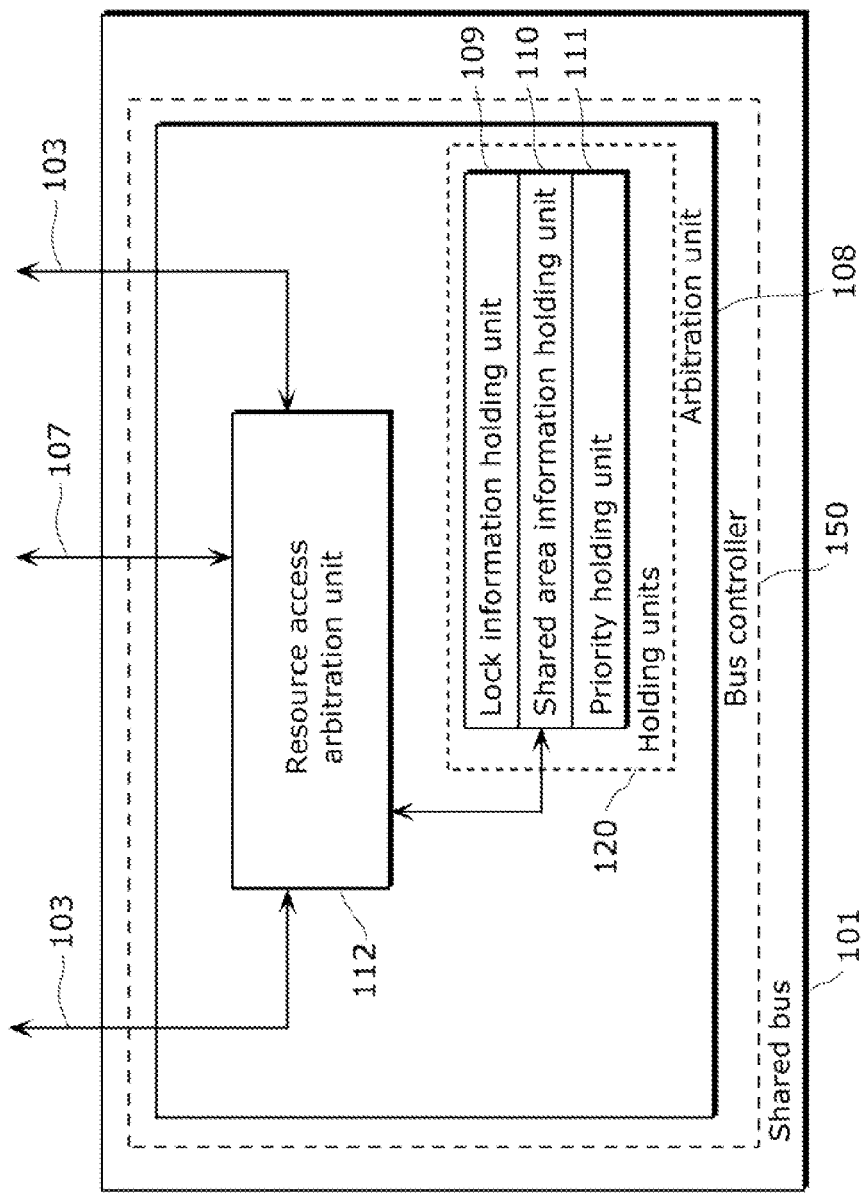
FIG. 16 is a configuration diagram of a bus controller according to Embodiment 2 of the present invention.

FIG. 16 is a configuration diagram of the bus controller 150 including the arbitration unit 108 according to Embodiment 2.

The bus controller 150 is a controller which controls access via the shared bus 101.

The bus controller 150 has the arbitration unit 108. The arbitration unit 108 arbitrates access confliction over the shared bus.

As illustrated in FIG. 16, the arbitration unit 108 includes a resource access arbitration unit 112 and a holding unit 120.

The resource access arbitration unit 112 stores access information i.e., lock information, shared area information, and priority information of processors into the holding unit 120.

More specifically, the holding unit 120 has a lock information holding unit 109, a shared area information holding unit 110, and a priority holding unit 111 configured to store the lock information, the shared area information, and the priority information of processors, respectively.

The resource access arbitration unit 112 performs access arbitration to the shared resource 102 per time period using the respective pieces of stored information.

The resource access arbitration unit 112 makes access arbitration using the Round Robin scheduling, for example, and thus levels the number of shared resource wait per processor.

By making an arbitration in consideration of priority, the resource access arbitration unit 112 may control priority of access to the shared resource 102 by each of the processor 200.

A result of the arbitration of confliction is sent to the scheduler management device 300 via the arbitration signal bus 107. The number of conflictions and task information in the current cycle are stored in the confliction counter 305 and the failure pattern storage unit 304, respectively.

That is to say, the multiprocessor system 100 according to the present embodiment further includes the shared bus 101 having the bus controller 150, and the shared resource 102 to which a plurality of processors write information via the shared bus 101.

In addition, the bus controller 150 has the holding unit 120 configured to hold the task identification information of two or more confliction tasks which are executed by each of a plurality of processors with overlapping time periods of writing to the shared resource 102.

With the above configuration, the command unit 310 can include task identification information in the command of change of task execution order, the task identification information indicating the confliction task which is a failure task and is currently held in the holding unit 120.

Consequently, the confliction is eliminated by rescheduling and a failure is more likely to be prevented. In the case where a failure occurs due to confliction, a timing of access to the shared resource 102 can be shifted by changing the task execution order.

The shared resource 102 may be at least one of a shared memory and an I/O interface, for example.

The resource access arbitration unit 112 can send idle information to the scheduler management device 300 via the is arbitration signal bus 107, the idle information indicating that access confliction has not occurred. Thus, the scheduler management device 300 can recognize the resource confliction and the idle situation in the execution time of a task set.

Consequently, the scheduler management device 300 can reduce access confliction by arbitrating the priority and access timing, and can perform aggressive scheduling of pending tasks at the time of idle.

Hereinafter, more detailed description will be provided.

Figure 17:
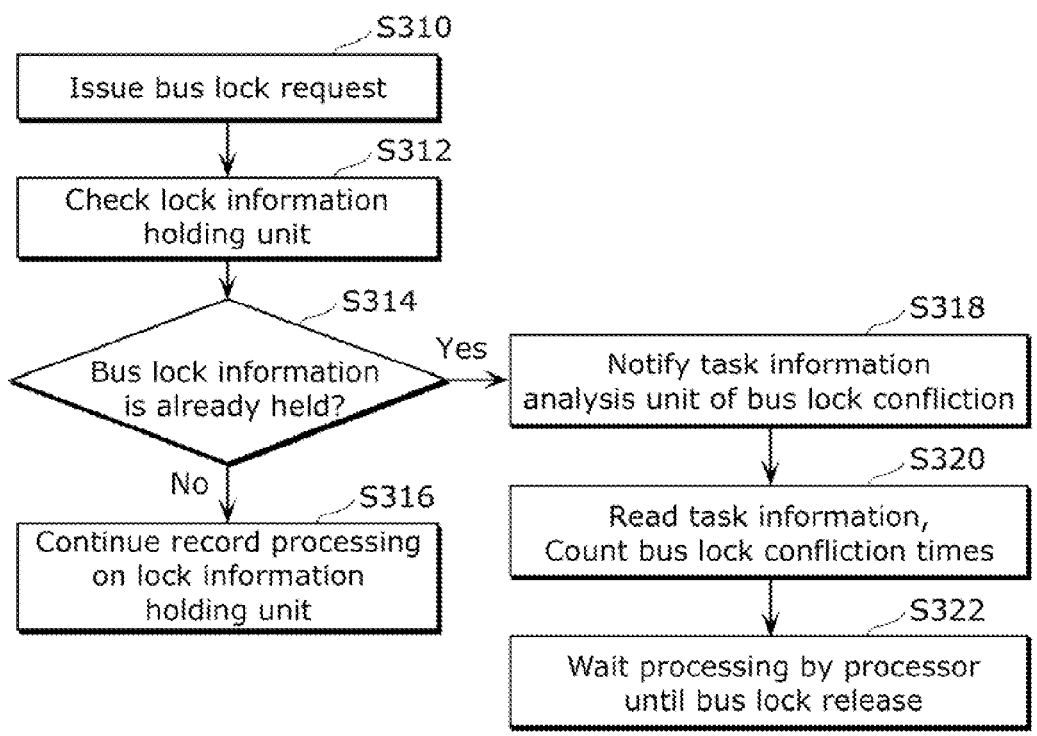
FIG. 17 is a flowchart illustrating the flow of bus lock access arbitration processing according to Embodiment 2 of the present invention.

FIG. 17 is a flowchart illustrating the flow of bus lock access arbitration processing according to Embodiment 2.

Upon receiving a request of bus lock from a processor 200 requesting access (for example, write to the shared memory) to the shared resource 102 (S310), the arbitration unit 108 checks the lock information holding unit 109 of the holding unit 120 (S312), and determines whether or not the shared bus 101 is already locked (S314).

When the shared bus 101 is not locked yet as a result of the determination (No in S314), the arbitration unit 108 stores lock information for eliminating access to the shared bus 101 from other processors into the lock information holding unit 109, and allows the processor 200 requesting bus lock to continue processing (S316).

On the other hand, when the shared bus 101 is already locked (Yes in S314), the arbitration unit 108 notifies the task information analysis unit 301 of the occurrence of bus lock confliction (S318).

Upon receiving the notification, the task information analysis unit 301 stores task information of a task in the failure pattern storage unit 304, execution of the task being interrupted due to confliction of access to the shared bus 101. Upon receiving each notification, the task information analysis unit 301 causes the confliction counter 305 to count-up so as to count the number of conflictions (S320).

Subsequently, the arbitration unit 108 keeps interrupting the processing of the processors other than the processor which has first acquired (first made a request of bus lock) the right of access to the shared bus 101, out of the processors contained in the processor 200 until the lock information on the shared bus 101 is deleted from the lock information holding unit 109 (S322).

According to the embodiment described above, the task information analysis unit 301 can recognize whether or not the cause of a failure of task execution is access confliction to the shared resource 102. In addition, the task information analysis unit 301 can utilize the result for rescheduling.

For example, as described above, the task information analysis unit 301 may identify a task which has failed due to access confliction, and the command unit 310 may command the task scheduler 201 to change the execution priority of the identified task.

If the cause of a failure of task processing is access confliction, the confliction may be eliminated by changing the execution priority of the task, and thus a failure is more likely to be prevented.

That is to say, in Embodiment 1, the task information analysis unit 301 performs scheduling using the information on the processor as to whether or not a failure has occurred. However, in the present embodiment, by performing scheduling using the confliction information on the bus, a failure is more likely to be prevented.

Embodiment 3

Hereinafter, a system LSI and a digital television having a multiprocessor system 100 according to Embodiment 2 of the present invention will be described with reference to the accompanying drawings.

Figure 18:
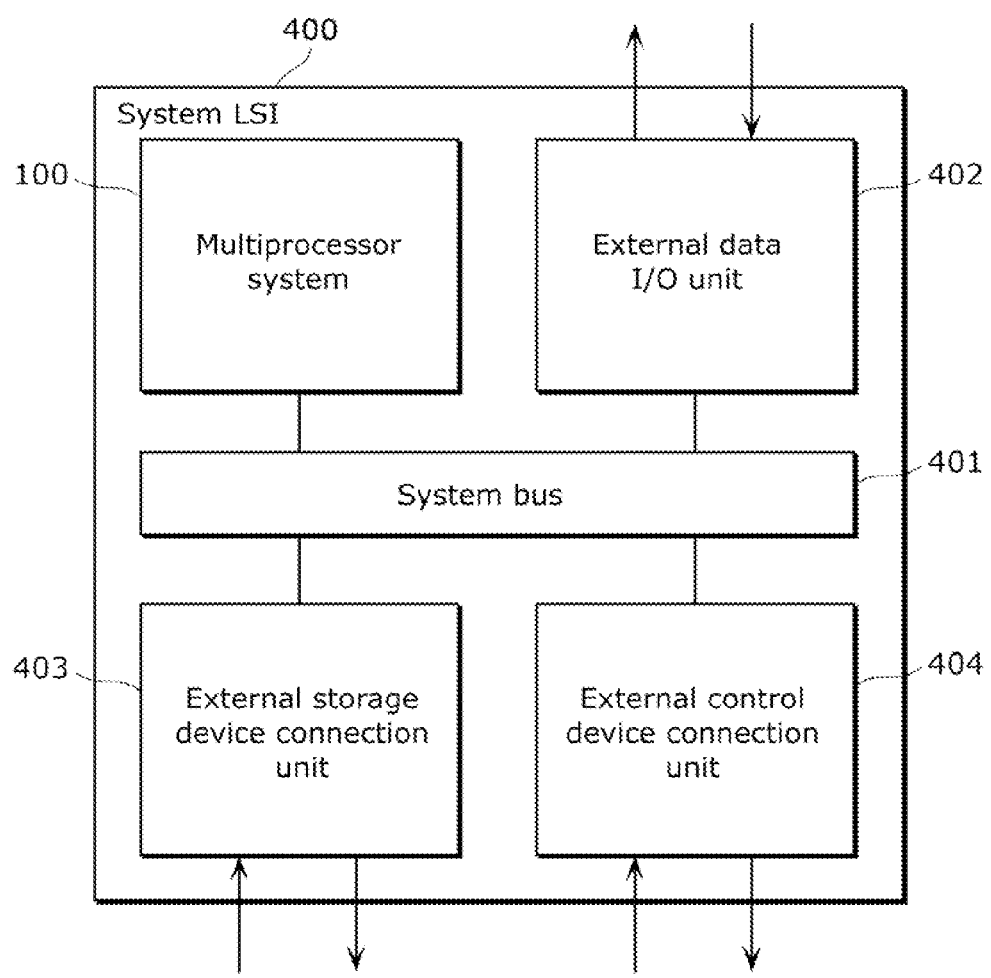
FIG. 18 is a configuration diagram of a system LSI having a multiprocessor system according to Embodiment 3 of the present invention.

FIG. 18 is a configuration diagram of a system LSI 400 having the multiprocessor system 100 according to Embodiment 3.

The system LSI 400 is used in, for example, digital television, and is a super-multifunctional LSI which is manufactured by integrating a plurality of components on a single chip. Specifically, the system LSI 400 includes a ROM (Read Only Memory), a RAM (Random Access Memory), a microprocessor, and the like The system LSI 400 achieves the function by causing a microprocessor to execute a computer program stored in a RAM.

The multiprocessor system 100 in FIG. 18 may have the same configuration as that of the multiprocessor system 100 described in Embodiment 1 or Embodiment 2, for example.

As illustrated in FIG. 18, the multiprocessor system 100 is connected to a system bus 401. The system bus 401 is connected to an external data input/output 402, an external storage connection unit 403, and an external control device connection unit 404.

Figure 19:
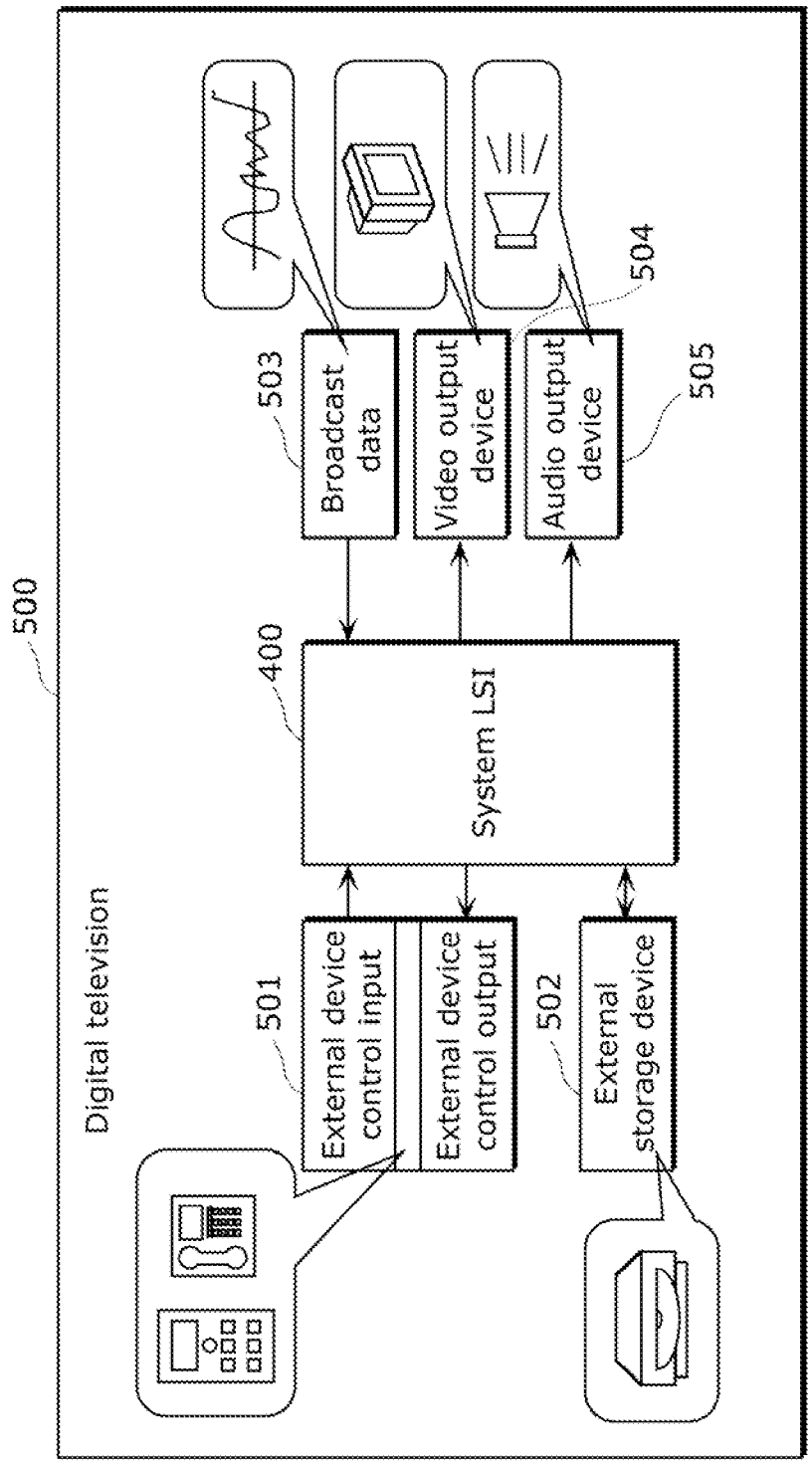
FIG. 19 is a configuration diagram of a digital television using the system LSI having the multiprocessor system according to Embodiment 3 of the present invention.

FIG. 19 is a configuration diagram of a digital television 500 using the system LSI 400 in the present embodiment.

As illustrated in FIG. 19, a digital television 500 is configured with the system LSI 400 using the multiprocessor system 100 in the present embodiment, the system LSI 400 being connected to an external control device 501 such as a remote controller, an external storage 502 such as a disk drive, a receiving device 503 for broadcast data, an image output device 504 such as a plasma panel or a liquid crystal panel for television, and au audio output device 505 such as a speaker.

As a result, it is possible to apply the multiprocessor system 100 to the digital television 500 illustrated in FIG. 19.

That is to say, the system LSI 400 according to the present embodiment is a system LSI which repeatedly executes task sets each including a plurality of tasks, the system LSI including the multiprocessor system 100, and the external data input/output 402, the external storage connection unit 403, the external control-equipment connection unit 404 which are connected to the multiprocessor system 100 via the system bus.

Each of the processor 200 of the multiprocessor system 100 has the task scheduler 201.

The multiprocessor system 100 includes the scheduler management device 300 having the command unit 310 which commands at least one of a plurality of task schedulers 201 to change the task execution order.

Upon receiving a command from the command unit 310, each of the task schedulers 201 changes the task execution order of the corresponding processor 200.

In the above-described Embodiments 1 and 2, the task scheduler 201 performs rescheduling by changing a task execution order in response to a rescheduling command from the command unit 310 of the task information analysis unit 301, however, the task scheduler 201 may perform rescheduling by another method.

Figure 7:
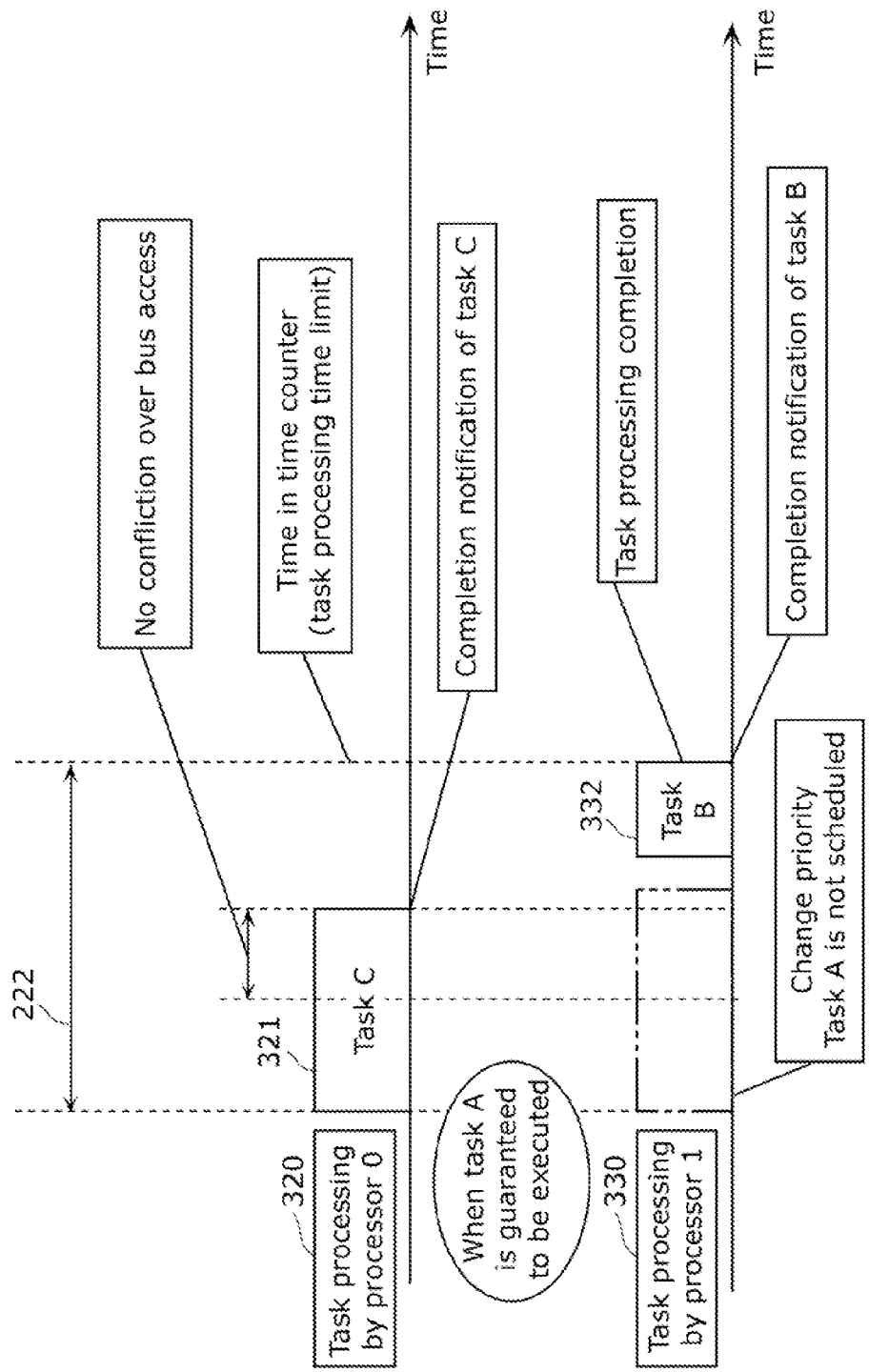
FIG. 7 is a reference diagram illustrating another example of failure avoidance of task processing according to Embodiments 1 to 3 of the present invention.

For example, as illustrated in FIG. 7, when task A331 is guaranteed to be completed without time restriction of the current task period, rescheduling may be made in such a manner that a new task set is formed by removing task A331 from the original task set, and task B332 and task C321 are executed within the task period 222.

Figure 8:
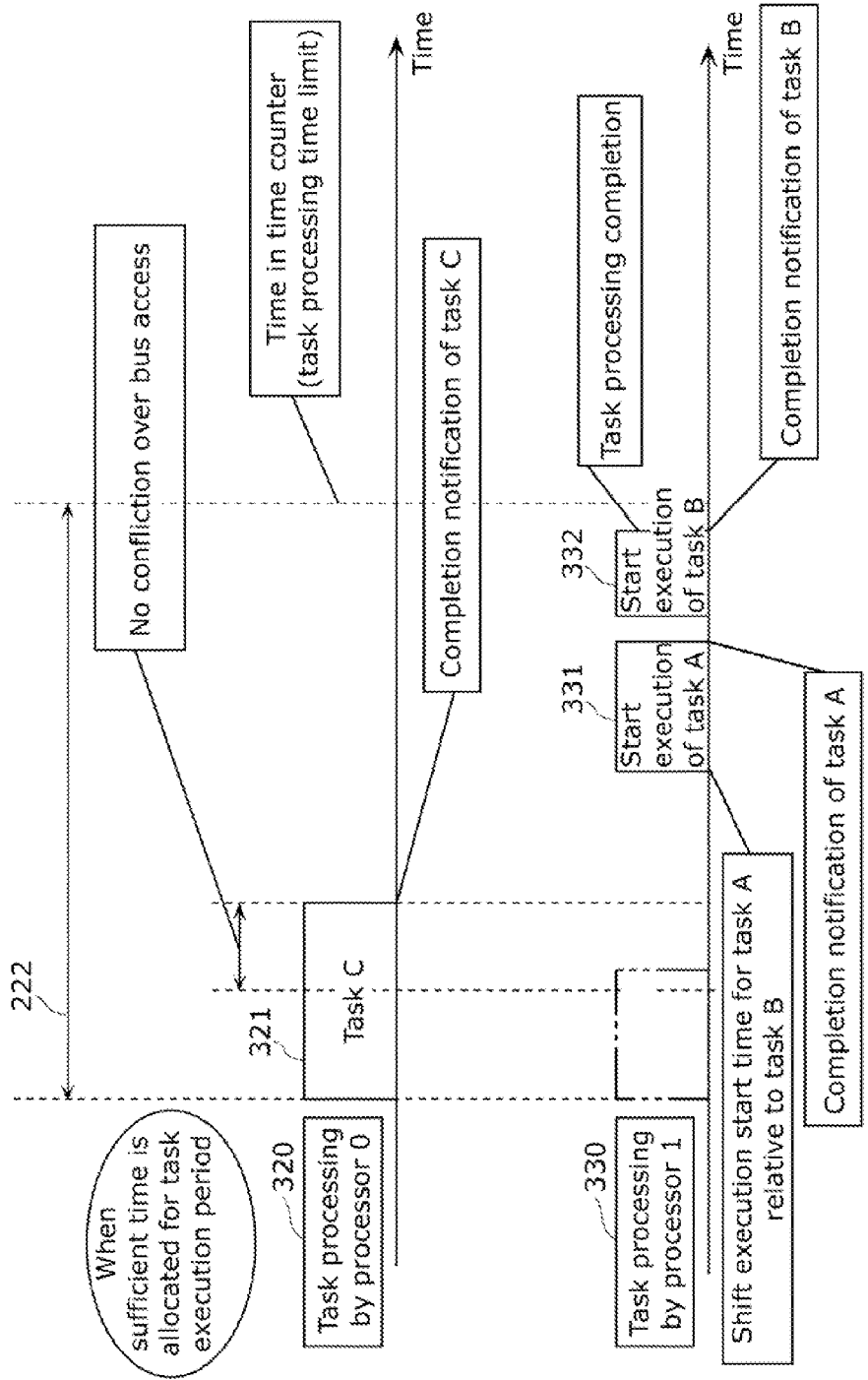
FIG. 8 is a reference drawing illustrating still another example of failure avoidance of task processing according to Embodiments 1 to 3 of the present invention.

Optionally, as illustrated in FIG. 8, when a sufficient time can be allocated to the current task period, rescheduling may be made in such a manner that the execution start time of each of task A331 and task B332 is delayed, and the task period is extended accordingly, thereby avoiding access confliction between task A331 and task C321.

The processing units of the multiprocessor system 100 according to the above-described Embodiments 1 to 3 are each typically achieved as an LSI which is an integrated circuit. These processing units may be individually implemented as a single chip, or all or part of the processing units may be implemented as a single chip.

Here, each processing unit is referred to as an LSI, but may be referred to as an IC, a system LSI, a super LSI, an Ultra LSI depending on the degree of integration.

The circuit integration may be achieved not only with an LSI but also with a dedicated circuit or a general-purpose processor. FPGA (Field Programmable Gate Array) or a reconfigurable processor for which connection and setup of the circuit cells inside an LSI can be reconfigured may be utilized.

Furthermore, in the case where new circuit integration technology which replaces the LSI is invented based on the progress of semiconductor technology or other emerging technology, each processing unit may be integrated using the new technology.

Part or all of the function of the multiprocessor system 100 according to Embodiments 1 to 3 of the present invention may be achieved by a processor such as a CPU executing a program.

In addition, the present invention may be the above-mentioned program or a recording medium on which the above-mentioned program is recorded. It is needless to state that the program may be distributed via a transmission medium such as the Internet.

At least part of the functions of the multiprocessor system 100 according to Embodiments 1 to 3 and the modification may be combined.

The numerical values given above are for the purpose of specifically describing the invention, and the present invention is not limited to the embodiments using the numerical values. For example, the number of the processors of the multiprocessor system 100 may be any integer greater than two.

The connecting relationships between the components herein are for the purpose of specifically describing the invention, and a connecting relationship which achieves the function of the present invention is not limited to the above connecting relationships.

Furthermore, various modifications of Embodiments 1 to 3, which occur to those skilled in the art without departing from the spirit of the present invention are also included in the invention.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is useful in assurance of real-time processing performance of a multiprocessor system which is used in a computer embedded system or the like.

The invention claimed is:

1. A multiprocessor system configured to repeatedly execute task sets that each include a plurality of tasks, the multiprocessor system comprising:
a plurality of processors, each including a task scheduler configured to determine a task execution order of the tasks included in a corresponding one of the task sets that is to be executed by a corresponding one of the processors within a task period which is defined as a time period in repeated execution of the task sets to be executed by the processors; and a scheduler management device having a command unit configured to issue a command for causing at least one of the task schedulers included in the plurality of processors to change the task execution order of the at least one of the task schedulers, wherein each of the at least one of the task schedulers is configured to change the task execution order of the at least one of the task schedulers in response to the command issued by the command unit, the task execution order of the at least one of the task schedulers being composed of the tasks included in the corresponding one of the task sets that is to be executed by the corresponding one of the processors including the at least one of the task schedulers, and wherein the scheduler management device is configured to:

compare first information regarding a task execution order of tasks included in a task set on which task set processing, which is processing for one repetition in the repeated execution of the task sets, is not completed within the task period, and second information regarding the task execution order determined by each task scheduler included in the plurality of processors, the first information being stored in the scheduler management device; and when the first information and the second information match each other, issue a command for causing the at least one of the task schedulers to change the task execution order of the at least one of the task schedulers.

2. The multiprocessor system according to claim 1, wherein the scheduler management device further includes a task comparison unit and a failure pattern storage unit, wherein the failure pattern storage unit is configured to store, as a failure pattern, information including (i) the first information and (ii) information regarding a processor ID of the corresponding one of the processors which executes the tasks in the corresponding one of the task sets and the task period, wherein the at least one of the task schedulers is configured to notify the task comparison unit of periodic scheduling information which includes (i) the task execution order of the tasks included in the corresponding one of the task sets to be executed by the corresponding one of the processors including the at least one of the task schedulers, (ii) the processor ID of the corresponding one of the processors including the at least one of the task schedulers, and (iii) the task period, wherein the task comparison unit is configured to determine whether or not the periodic scheduling information matches the failure pattern by comparing the periodic scheduling information with the failure pattern, and wherein, when the periodic scheduling information matches the failure pattern, the command unit is configured to issue the command for causing the at least one of the task schedulers to change the task execution order of the at least one of the task schedulers, the command being included in the periodic scheduling information.

3. The multiprocessor system according to claim 1, wherein the scheduler management device is configured to determine whether or not a task set processing is completed within the task period, the task set processing being performed on one of the tasks included in the corresponding one of the task sets and completed last, and wherein, when the scheduler management device determines that the task set processing is not completed within the task period, the command unit is configured to issue the command for causing the at least one of the task schedulers to change the task execution order of the at least one of the task schedulers.

4. The multiprocessor system according to claim 1, wherein the scheduler management device further includes a task period counter, a completed task storage unit, and a failure determination unit, wherein each of the processors is configured to notify the scheduler management device of task identification information of one of the tasks on which the task set processing is completed, the task set processing being processing for one repetition in the repeated execution, wherein the completed task storage unit is configured to store the task identification information of the one of the tasks on which the task set processing is completed, wherein the task period counter is configured to count a number of cycles after the processors start execution of the corresponding task sets, wherein the failure determination unit is configured to determine whether or not a failure task is present which is not stored in the completed task storage unit at a moment when the number of cycles exceeds the number of cycles corresponding to the task period, the failure task being one of the tasks in one of the task sets, and wherein, when the failure determination unit determines that at least the failure task is present, the command unit is configured to issue the command for causing the at least one of the task schedulers to change the task execution order of the at least one of the task schedulers.

5. The multiprocessor system according to claim 4, wherein the command for causing the at least one of the task schedulers to change the task execution order of the at least one of the task schedulers contains task identification information of at least the failure task, and wherein the at least one of the task schedulers is configured to change the task execution order of the at least one of the task schedulers, so that a task corresponding to the task identification information has an execution priority lower than an execution priority of another task to be executed by one of the processors which is configured to execute the task corresponding to the task identification information.

6. The multiprocessor system according to claim 5, further comprising:

a shared bus having a bus controller; and a shared resource in which the processors are configured to write information via the shared bus, wherein the bus controller includes a holding unit configured to hold task identification information of two or more confliction tasks which are write operations scheduled to be performed on the shared resource by two or more of the processors on overlapping time periods, and wherein the command unit includes, in the command for causing the at least one of the task schedulers to change the task execution order of the at least one of the task schedulers, the task identification information of the confliction tasks held in the holding unit, the confliction tasks each being the failure task.

7. The multiprocessor system according to claim 6, wherein the shared resource is either a shared memory or an input/output interface.

8. The multiprocessor system according to claim 4, wherein the scheduler management device further includes a failure pattern storage unit and a task comparison unit, wherein, in a case where the failure determination unit determines that a failure task is included in an executed task set, the scheduler management device is configured to store, in the failure pattern storage unit, as a failure pattern, information including a task execution order of tasks included in the executed task set, a processor ID of the corresponding one of the processors which executes the tasks in the corresponding one of the task sets, and a task period which are included in the corresponding one of the task sets, wherein the at least one of the task schedulers is configured to notify the task comparison unit of periodic scheduling information which includes the task execution order of the tasks included in the corresponding one of the task sets to be executed by the corresponding one of the processors including the at least one of the task schedulers, the processor ID of the corresponding one of the processors, and the task period, wherein the task comparison unit is configured to determine whether or not the periodic scheduling information matches the failure pattern by comparing the periodic scheduling information with the failure pattern, and wherein, when the periodic scheduling information matches the failure pattern, the command unit is configured to issue the command for causing the at least one of the task schedulers to change the task execution order of the at least one of the task schedulers, the command being included in the periodic scheduling information.

9. The multiprocessor system according to claim 4, wherein the task period counter is a register.

10. The multiprocessor system according to claim 1, wherein the command unit is configured to issue the command for causing the at least one of the task schedulers to make a schedule change including a change of the task execution order of the at least one of the task schedulers, and wherein each of the at least one of the task schedulers is configured to change a remaining task execution time of the corresponding one of the processors, in response to the command to make the schedule change issued by the command unit.

11. The multiprocessor system according to claim 1, wherein each of the processors has a time counter configured to send a remaining task execution time to the at least one of the task schedulers, wherein the command unit is configured to issue the command for causing the at least one of the task schedulers to make a schedule change including a change of the task execution order of the at least one of the task schedulers, and wherein each of the at least one of the task schedulers is configured to change a remaining task execution time of a corresponding one of the time counters, in response to the command to make the schedule change issued by the command unit.

12. A system Large-Scale Integrated circuit (LSI) configured to repeatedly execute task sets that each include a plurality of tasks, the system LSI comprising:
a multiprocessor system;
an external data input/output unit;
an external storage connection unit; and an external control device connection unit which are connected to the multiprocessor system via a system bus,
wherein the multiprocessor system includes a plurality of processors, each including a task scheduler configured to determine a task execution order of the tasks included in a corresponding one of the task sets that is to be executed by a corresponding one of the processors within a task period which is defined as a time period in repeated execution of the task sets to be executed by the processors;
wherein the multiprocessor system includes:
a scheduler management device having a command unit configured to issue a command for causing at least one of the task schedulers included in the plurality of the processors to change the task execution order of the at least one of the task schedulers,
wherein each of the at least one of the task schedulers is configured to change the task execution order of the at least one of the task schedulers in response to the command issued by the command unit, the task execution order of the at least one of the task schedulers being composed of the tasks included in the corresponding one of the task sets to be executed by the corresponding one of the processors including the at least one of the task schedulers, and
wherein the scheduler management device is configured to:
compare first information regarding a task execution order of tasks included in a task set on which task set processing, which is processing for one repetition in the repeated execution of the task sets, is not completed within the task period, and second information regarding the task execution order determined by each task scheduler included in the plurality of processors, the first information being stored in the scheduler management device; and
when the first information and the second information match each other, issue a command for causing the at least one of the task schedulers to change the task execution order of the at least one of the task schedulers.

13. A digital television receiver including the system LSI according to claim 12.

\* \* \* \* \*